Aug. 18, 1936.   P. J. GABRIEL ET AL   2,051,696
TIRE FOR ROLLER SKATES
Filed Jan. 17, 1934

Peter J. Gabriel
Frank J. Kammerer
INVENTORS

BY *Victor J. Evans & Co.*

ATTORNEY

Patented Aug. 18, 1936

2,051,696

UNITED STATES PATENT OFFICE 2,051,696

TIRE FOR ROLLER SKATES

Peter J. Gabriel and Frank J. Kammerer, Brooklyn, N. Y.

Application January 17, 1934, Serial No. 707,014

1 Claim. (Cl. 208—181)

This invention relates to supplemental or extra tires for roller skates adapted to take the wear in skating.

The usual tires provided on roller skates wear down quickly so that it is necessary to frequently replace the old rollers with new ones. These replacements are comparatively expensive and we have therefore invented a form of tire adapted to be placed over the usual tire and to take the wear, thereby preserving the usual tire, the tire of our invention being simple in construction and economical to manufacture and readily placed on and removed from a roller skate wheel.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claim.

Figure 1:
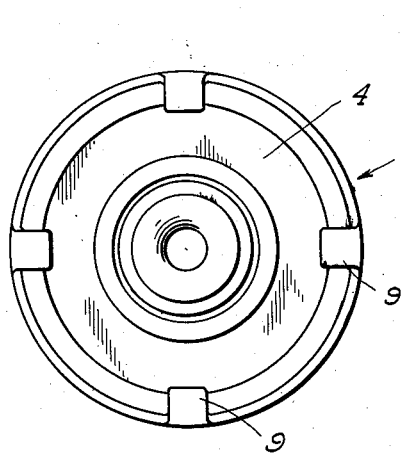
Fig. 1 is an elevational view of the inner side of a roller skate wheel with the tire of our invention mounted thereon.
Figure 2:
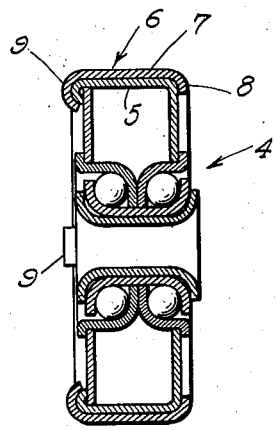
Fig. 2 is a central sectional view of the wheel and extra tire shown in Fig. 1.
Figure 3:
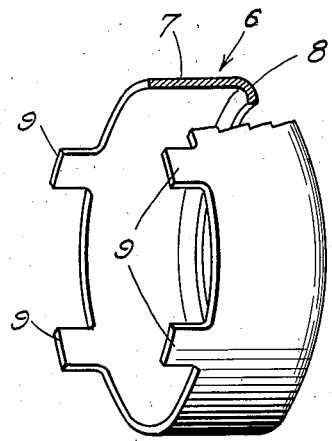
Fig. 3 is a broken perspective view of the tire of our invention.

Referring to the drawing for a more detailed description thereof, the numeral 4 indicates a roller skate wheel having a tire 5 over which is placed the supplemental tire 6 of our invention. As clearly shown in Fig. 3, the tire of our invention comprises a tread portion 7 and an annular flange 8 integral with and extending inwardly from the tread 7 and adapted to contact the outer side of the wheel 4. The tire of our invention may be readily placed on a skate wheel by sliding it onto said wheel from the outer side of the latter, after which the lugs 9, which are integral with and extend from the inner edge of the tread 7 of the supplemental tire, are bent over onto the curved inner edge of the regular tire 5 to securely hold the tire of our invention in place. That the tire of our invention is well adapted for the purpose intended will readily be appreciated.

What is claimed is:

The combination, with a roller skate wheel having a permanent tire, of a supplemental one-piece metallic tire thereon adapted to take the wear, said supplemental tire being adapted to be applied thereto by sliding laterally onto said permanent tire and comprising a tread portion, an annular flange extending inwardly from the outer edge of said tread portion, spaced fastening lugs extending from the inner edge of said tread portion and adapted to be bent over onto said permanent tire, said supplemental tire being retained on said permanent tire solely by said flange and lugs.

PETER J. GABRIEL.
FRANK J. KAMMERER.